Nov. 12, 1957   R. SANDOR   2,812,804
ADJUSTABLE BACK REST FOR SEAT
Filed Aug. 16, 1954   2 Sheets-Sheet 1
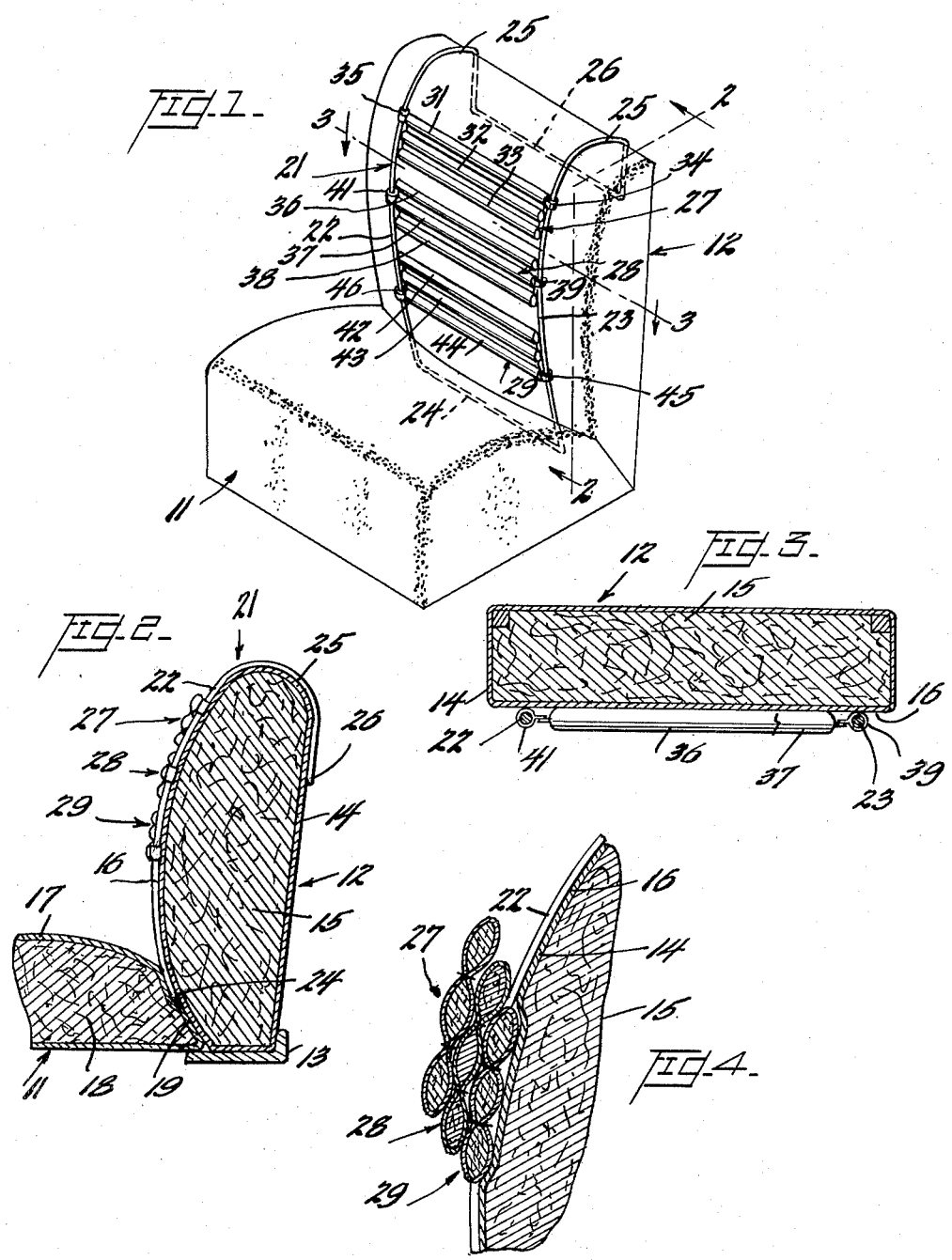
INVENTOR.
Ralph Sandor,
BY
ATTORNEYS

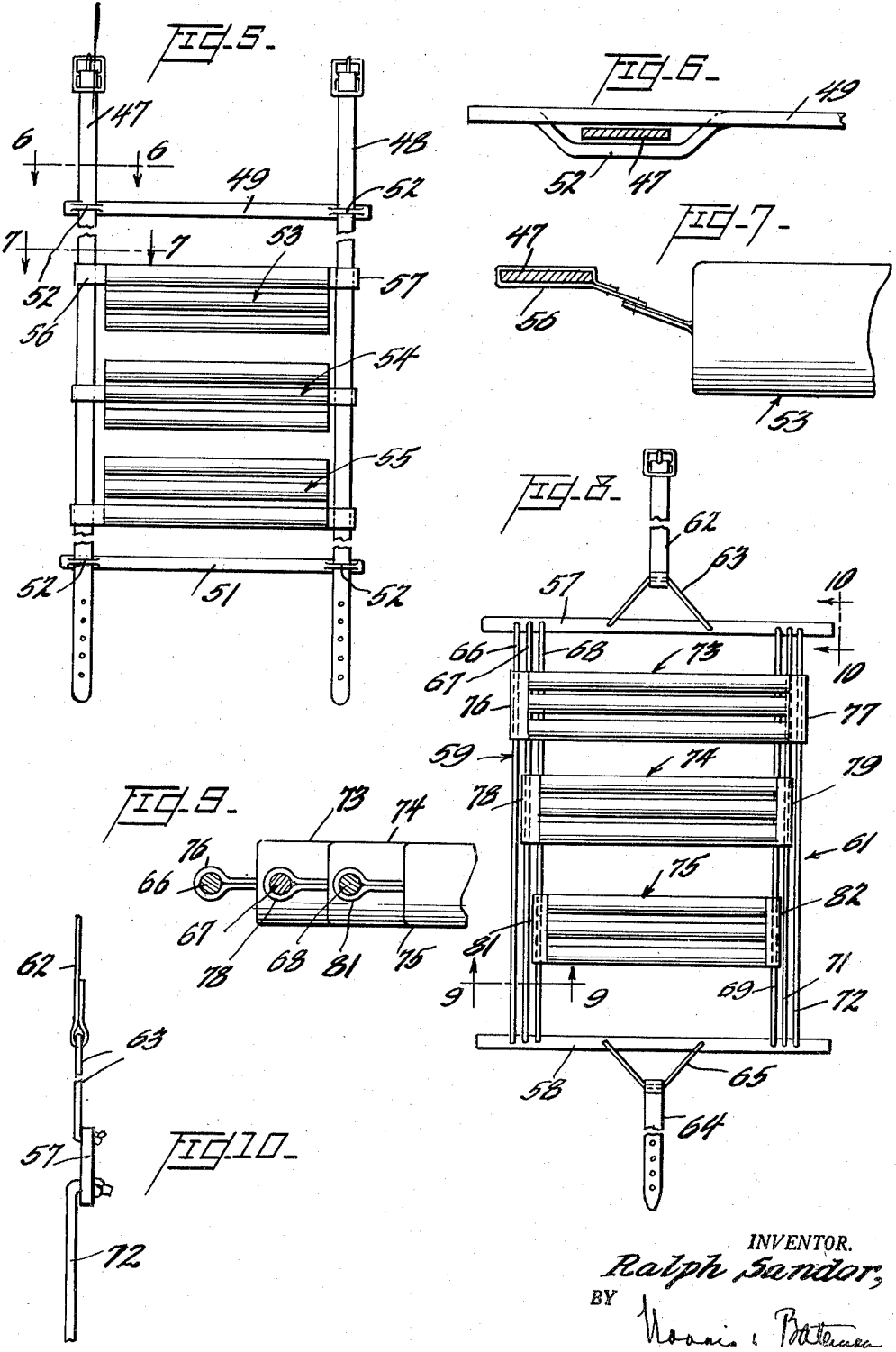

United States Patent Office 2,812,804
Patented Nov. 12, 1957

2,812,804

ADJUSTABLE BACK REST FOR SEAT

Ralph Sandor, Passaic, N. J.

Application August 16, 1954, Serial No. 450,043

15 Claims. (Cl. 155—182)

This invention relates to adjustable back rests for seats such as automobile seats wherein the adjustment selectively and locally changes the effective thickness of the back rest with respect to the contour of the seat back for optimum comfort of the user.

Essentially the invention comprises in its preferred physical embodiments a plurality of vertically displaced groups of transverse cushions all mounted on a support of some type for attachment to the seat structure, with the cushions of each group being relatively adjustable to relatively increase or decrease the back rest thickness at each group to suit the user.

It is therefore the major object of the invention to provide a novel adjustable thickness back rest for an automobile or like seat wherein vertically spaced groups of transverse cushions may be independently relatively adjusted to provide different thicknesses of back rest at each locale to suit the user.

Further objects of the invention will become apparent as the description proceeds in connection with the appended claims and the annexed drawings wherein:

Figure 1 is a generally perspective view illustrating an adjustable thickness back rest according to a preferred embodiment of the invention mounted on an automobile seat;

Figure 2 is a section substantially on line 2—2 of Figure 1 showing how the back rest is attached to the seat;

Figure 3 is a section on line 3—3 of Figure 1;

Figure 4 is an enlarged fragmentary section showing how the cushions of each group may be relatively displaced to provide the localized thickness adjustment;

Figure 5 is an elevation of an adjustable back rest according to a further embodiment of the invention;

Figure 6 is a section on line 6—6 of Figure 5;

Figure 7 is a section on line 7—7 of Figure 5;

Figure 8 is an elevation of an adjustable back rest according to a further embodiment of the invention;

Figure 9 is a section on line 9—9 of Figure 8; and

Figure 10 is a section on line 10—10 of Figure 8.

Referring to Figure 1, the usual automobile front seat is shown as having a seat cushion 11 and a back cushion 12. Ordinarily these seat cushions are removable while the back cushions are fixed upon a supporting frame attached to the car floor and indicated at 13.

As shown in Figure 2, the back cushion 12 comprises a relatively rigid skeleton (no detail shown) covered with cloth 14 and containing resilient or padding material 15 of a conventional type, and the front surface 16 of the back cushion 12 is convex. Similarly the seat cushion comprises a skeleton covered with cloth 17 and containing resilient or padding material 18. When the seat cushion is mounted on the frame 13, its rear end 19 usually tightly abuts the lower end of the front surface of the back cushion. Both cushions contain the usual springs and supports of automobile seats.

The adjustable thickness back rest in this embodiment of the invention is a removable and attachable unit the supporting frame 21 of which is relatively rigid and comprises vertical parallel side rails 22 and 23 curved to follow the contour of surface 16 and joined at their lower ends by transverse bottom rail or bar 24. Referring to Figure 2 the upper ends of side rails 22 and 23 have substantial J-shape as indicated at 25 to hook over the top of the back cushion 12, and their ends are joined by transverse top rail or bar 26. Frame 21 is made up preferably of one or more lengths of smooth surfaced small diameter metal rod or tubing capable of being bent to the proper curvature and with the side, top and bottom rails all rigidly secured together.

The lower end of frame 21 extends down into the space between the back 19 of the seat cushion and the lower part of back cushion surface 16 to be there frictionally held by the seat cushions.

The stiff side rails 22 and 23 provide slide guides for relative adjustment of cushion groups as will now appear. Three spaced cushion groups 27, 28 and 29 are illustrated. Group 27 comprises three transverse cushion elements 31, 32 and 33. These cushion elements may be formed by starting with a single wide, flat cushion and transversely corrugating or ridging it as by sewing into three separate cushion elements as shown in Figure 4 or three individual cushion elements may be secured together along their edges. In any event the cushion elements are generally oval in cross section with the long axis of the oval vertical.

At its opposite ends cushion element 31 has secured thereto as by sewing loops of elastic tape 34 and 35 preferably under slight tension so that the loops tend to maintain cushion group 27 in a given position on the frame 21 but permit group 27 to be slidably displaced along the side rails to any desired vertical position on back cushion surface 16. The elastic loops it will be noted are no larger than the associated cushion element, or about ⅓ the height of the cushion group.

Similarly group 28 comprises three transverse cushion elements 36, 37 and 38 fabricated and secured together as in group 27. In this group however the elastic tape rail attached end loops 39 and 41 are sewed or otherwise secured to the opposite ends of middle cushion element 37. Group 29 comprises three transverse cushion elements 42, 43 and 44 and here the elastic loops 45 and 46 for slidably mounting group 29 on the frame side rails are attached to the opposite ends of bottom cushion element 44. The elastic loops in each case are no greater than ⅓ the height of the associated cushion group.

Each of cushion groups 27, 28 and 29 may be slidably moved up or down the frame 21 to any desired position and any adjacent two or all three may be overlapped to locally thicken the back rest as may be desired in any vertical position on the frame 21. For example Figure 4 shows all three cushion groups in overlapped relation giving the maximum thickness adjustment which may be located vertically anywhere along the frame.

Referring to Figures 5, 6 and 7, the back rest frame is much more flexible than in Figures 1–4, here comprising flat parallel vertical flexible side straps 47 and 48 of leather, plastic or the like bridged by rigid cross bars of flat metal 49 and 51 that (see Figure 6) are formed with loops 52 through which the side straps slidably pass. Bars 49 and 51 maintain the straps spaced and parallel.

Intermediate the cross bars, three cushion groups 53, 54 and 55 are vertically slidably adjustable along the frame. Each cushion group is substantially the same as those of Figures 1–4 and comprises three parallel cushion elements. The upper cushion group 53 is provided at opposite ends of its top cushion element with loops 56 (Figure 7) for slidably mounting it on the side straps. Similar loops at the ends of the middle cushion element of group 54, and loops at the ends of the lower cushion element of group 55 slidably embrace the side straps.

In practice the frame of Figures 5–7 is draped over the back cushion of the automobile seat with the cushion groups behind the driver's back as in Figure 1. The perforated strap ends are passed under the lower end of the back cushion and up to enter the buckle ends which are passed over and down behind the back cushion, and are drawn tight to secure the frame on the back cushion. With the frame thus in place the cushion groups may be moved to any relative or overlapped position as in the embodiment of Figures 1–4. In the assembly the top spacer bar 49 is usually located across the back of the back cushion while the lower spacer bar 51 is moved down between the seat and back cushions.

Referring now to Figures 8, 9 and 10 the back rest frame comprises parallel flat metal cross or spacer bars 57 and 58 and flexible intermediate side members 59 and 61 which are of the same length and secured at opposite ends to the spacer bars. A buckle end strap 62 is attached slidably to a cord yoke 63 secured centrally to the top bar, and a perforated end strap 64 is similarly attached to a cord yoke 65 secured centrally to the bottom bar, the strap ends being free to adjust themselves on the cord yokes.

Side members 59 consist of three parallel cords 66, 67 and 68 secured at their opposite ends to the spacer bars, and side member 61 consists of three parallel cords 69, 71 and 72 secured at their opposite ends to the spacer bars.

Intermediate the spacer bars are three cushion groups 73, 74 and 75 as in the other embodiments each made up of three cushion elements. Upper group 73 has attached at opposite ends, as by sewing thereto, loops 76 and 77 slidably embracing the outermost cords 66 and 72. Middle group 74 has attached at its opposite ends loops 78 and 79 slidably embracing the middle cords 67 and 71. Lower group 75 has attached at its opposite ends loops 81 and 82 slidably embracing the innermost cords 68 and 69.

The frame of Figures 8–10 is strapped to the back cushion just like that of Figures 5–7, with bars 57 and 58 on the back of the back cushion and down between the cushions respectively so as to be out of contact with the operator. The cushions 73—75 may be adjustably shifted vertically on side members 59 and 61 to increase the thickness of any part of the back rest at any location as in the other embodiments. Since the cushion groups are progressively shorter toward the bottom, as illustrated exaggeratedly in Figure 8 to show the separate cords and loops, they may all be moved to fully overlapped position if desired.

Thus in all of these embodiments of the invention, a frame is suited to the contour of the back cushion of the seat, and the seat cushion groups are slidably adjustable up or down on the frame to any desired position. If the cloth is mohair for example and the cushion elements are cloth covered, there is enough friction between them that the cushion groups tend to maintain any adjusted position. Also the use of elastic end loops for the cushion elements slightly tensioned in the assembly will maintain such position even where the back rest is used over slippery seat covers.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An adjustable back rest for an automobile seat or the like comprising a frame adapted to be mounted on the back cushion of the seat and having parallel side members connected by cross members at substantially spaced points, a plurality of separate transverse cushion members extending between said side members, said cushion members being unconnected except through said side members, and means at opposite ends of said cushion members individually slidably mounting them on said side members for enabling relative movement of said cushion members substantially parallel to each other upon said side members into desired relative overlap positions for providing a cushion region of increased and variable thickness at any location along the frame.

2. The adjustable back rest defined in claim 1 wherein said frame comprises relatively stiff side members interconnected at their opposite ends by relatively stiff cross bars.

3. The adjustable back rest defined in claim 1, wherein the side members are flexible and the cross members are stiff bars.

4. The adjustable back rest defined in claim 1 wherein the side members are flexible straps and the cross members are stiff bars slidably connected at opposite ends to the straps.

5. The adjustable back rest defined in claim 1 wherein the cross members are rigid bars, and intermediate section of each of the side members comprises a group of cords one for each cushion member attached at opposite ends to the bars, and flexible seat attachment straps are connected to the cross bars.

6. The adjustable back rest defined in claim 1 wherein said cross members are rigid and effectively fixedly space said side members.

7. An adjustable back rest for a seat assembly having a generally upright back portion comprising a frame adapted to be mounted on said back portion and a plurality of separate transverse cushion groups individually mounted on the frame for relative vertical adjustment, said cushion groups being connected to each other only through said frame, each of said groups comprising a plurality of cushion elements and said cushion elements being adapted to overlap in certain positions of relative adjustment of said cushion groups to provide an increased thickness cushion region at a desired location along the frame.

8. In an adjustable back rest for the upright back portion of a seat assembly, a frame made up of parallel side members and spaced cross members and at least two separate similar groups of transverse cushion elements individually slidably connected at opposite ends to said side members, said cushion groups being unconnected except through said side members, the slide connections of the respective groups being relatively displaced to permit overlap for increased back rest thickness in certain positions of relative adjustment of said groups.

9. In the back rest defined in claim 8, each said cushion groups comprising at least two transverse cushion elements secured together along their coextensive edges.

10. In combination in an adjustable back rest, a frame comprising parallel side members of relatively stiff bendable material, stiff cross members fixedly connecting said side members near their adjacent ends, and a plurality of separate parallel transverse cushion groups having their opposite ends individually slidably connected to said side members for relative overlap adjustment along said frame.

11. In combination in an adjustable back rest, a frame comprising spaced parallel flexible straps having interlocking connections at opposite ends, spaced relatively stiff cross members slidably connected at opposite ends to said straps for maintaining the strap portions therebetween generally parallel, and a plurality of separate parallel transverse cushion groups having their opposite ends individually slidably connected to said side strap portions for relative overlap adjustment along said frame.

12. In combination in an adjustable back rest, a frame comprising stiff cross members and flexible side members, each of said side members being secured at opposite ends to said cross members, flexible end members secured to the respective cross members and terminating in interlocking connections, each of said side members being of about equal length, and a plurality of separate transverse cushion groups having their opposite ends individually slidably connected to said side members for relative adjustment into overlap of said cushion member at any selected location along the frame between said cross members.

13. In the combination defined in claim 12, said side members each comprising a plurality of parallel cords, and said cushion groups having their ends slidably connected to corresponding different cord pairs at opposite sides.

14. In combination in an adjustable back rest, a frame comprising stiff cross members and flexible side members, each of the side members being secured at opposite ends to said cross members, a plurality of separate transverse cushions having their opposite ends individually slidably connected to said side members intermediate said cross members for relative overlap adjustment along the frame between said cross members, and flexible end members slidably adjustably connected to said cross members and having interlocking terminals for mounting the frame upon a seat assembly.

15. In the combination defined in claim 14, said end members being flexible straps slidably connected to substantially medially located loops on said cross members.

References Cited in the file of this patent

UNITED STATES PATENTS

| | | |
|---|---|---|
| 1,007,985 | Smith | Nov. 7, 1911 |
| 1,291,975 | McNulty | Jan. 21, 1919 |
| 2,060,298 | Gailey | Nov. 10, 1936 |
| 2,139,028 | Mensendicck et al. | Dec. 6, 1938 |
| 2,182,253 | Farrell | Dec. 5, 1939 |
| 2,260,352 | Trapani | Oct. 28, 1941 |
| 2,307,331 | Parker | Jan. 5, 1943 |